Jan. 19, 1932. W. G. LAIRD 1,842,180

PROCESS AND APPARATUS FOR DISTILLATION

Original Filed June 20, 1923  2 Sheets-Sheet 1

Vapors —V→
Gas —G→
Reflux —R→
Liquid —L→

Vapors and Gas —VG→
Liquid and Gas —LG→
Residuum —Res→

WILBUR G. LAIRD  Inventor

By his Attorney
Benj. T. Rauber

Patented Jan. 19, 1932

1,842,180

UNITED STATES PATENT OFFICE

WILBUR G. LAIRD, OF PLEASANTVILLE, NEW YORK, ASSIGNOR, BY MESNE ASSIGNMENTS, TO HEAT TREATING COMPANY, OF NEW YORK, N. Y., A CORPORATION OF DELAWARE

PROCESS AND APPARATUS FOR DISTILLATION

Application filed June 20, 1923, Serial No. 646,718. Renewed November 11, 1931.

This invention relates to a method and apparatus for distillation and, more particularly, to a distilling method and apparatus in which several fractionating or re-distilling effects are obtained.

In the distillation and fractionation of liquids, a large part of the heat used in vaporizing the distillate is absorbed and carried in the vapors leaving the still. The heat thus contained in the vapors has a corresponding capacity for thermal work which, in the ordinary type of distillation, in which successive vacuum effects are not, or can not, be used, is entirely or partly lost or dissipated in the condenser without the production of any corresponding useful result or effect. Accordingly, distilling apparatus of the type commonly used heretofore has had a very low thermal efficiency, the thermal work accomplished, being negligible in comparison with the heat energy used. When a fractionating tower is used, the thermal efficiency is still lower, and the efficiency or effectiveness of fractionation is limited to some extent by the additional quantity of heat which may be allowed for this purpose.

One of the objects of my invention is to provide a method and an apparatus in which a high net evaporative effect and a high thermal efficiency may be obtained from the heat used in the evaporation, distilling or fractionation of liquids.

Another object of the invention is to provide a method and an apparatus in which an effective separation of products of different volatility may be obtained by distillation.

Further objects and features of my invention are to provide a distilling method and apparatus in which the heat energy available for useful work in the temperature drop from the still to the condenser may be efficiently utilized to augment the evaporation of the liquid subjected to distillation and to provide a more thorough and effective fractionation effect. Further objects of the invention are to strip the residue material of volatile constituents and to free the end vapors passing to the condenser of heavy ends to the greatest extent practicable. Further objects and features of the invention are to provide a simpler, more flexible, and more easily operated apparatus, to provide improved fractionating elements and to render it possible to obtain multiple evaporative and condenser effects without the use of vacuum.

With these and other objects in view, the invention comprises the apparatus and method described and set forth in the following specification and claims.

The various features of the invention are illustrated in the accompanying drawings, in which.

This application contains certain subject matter in common with that of my co-pending application Serial No. 349,262.

In my present invention, the vapors of the liquid undergoing distillation are passed through fractionating units at successively lower temperatures and the liquid to be distilled is passed through the units in a counter direction and in a heat receiving relation to the vapors, serving to condense portions of the vapors and be itself partially evaporated in successive stages. The vaporized and unvaporized raw liquor is then added to the distillation system. Sufficient heat is added to the residual liquor to vaporize and remove the more volatile constituents remaining in the liquid and the vapors then pass in succession through the fractionating units. In passing through each unit, the vapors contact with the condensate in the unit and are brought into equilibrium therewith to exchange their less volatile constituents for more volatile constituents of the condensate. The vapors then pass into heat interchanging relation to the liquid passing to the boiler or vaporizing system and thus serve to evaporate a portion of the liquid to be distilled and leave only the higher boiling constituents and residue to be supplied to the boiler of the still.

The liquid to be distilled is progressively vaporized as it passes through stages of progressively higher temperature, a mixture of liquid and vapor being formed which passes to the still and fractionating system. To assist in vaporizing the liquid in the lower temperature stages, a quantity of gas may be supplied with the initial liquid and be recirculated through the system. In case it is desirable to strip the residuum as much as possible of light vapors, the vaporized portion of the raw liquor may be separated from the liquid and supplied to one of the fractionating units while the liquid, freed of its more volatile constituents, is supplied to the boiler or vaporizer.

Figures 1, 2:
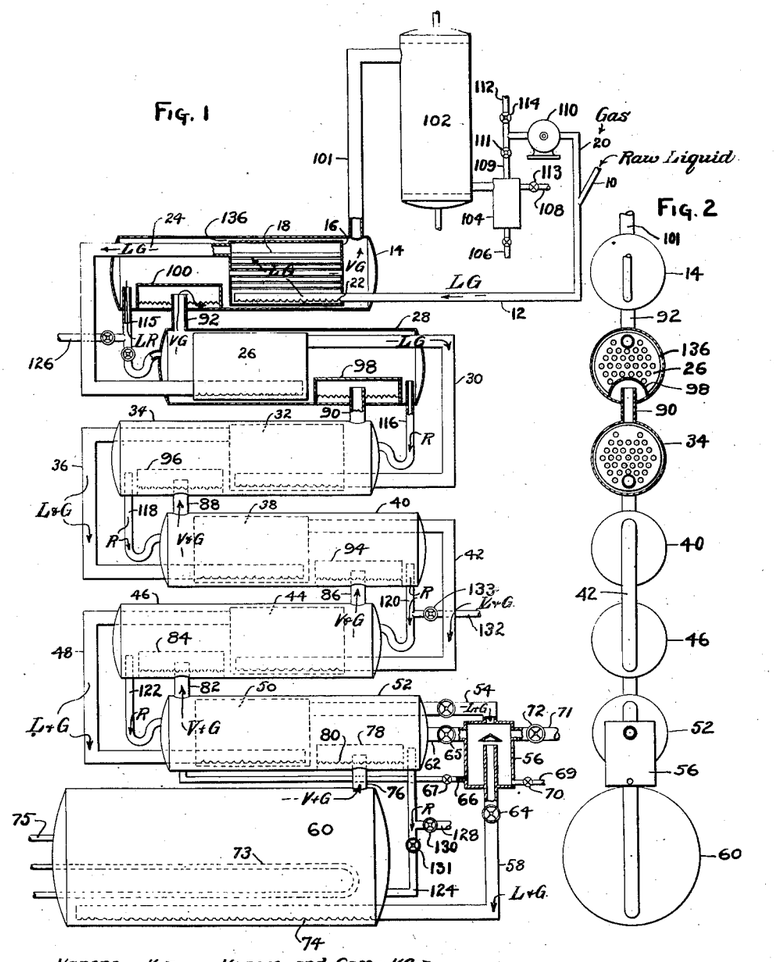
Fig. 1 is a diagrammatic vertical side elevation partly in section, of a distilling apparatus embodying a preferred form of the invention, flanges, fittings and details of construction being omitted in the interest of clearness.
Fig. 2 is an end elevation, partly in section, of the apparatus shown in Fig. 1.

Referring more particularly to the accompanying drawings, liquid to be distilled is supplied from a supply pipe 10 through an inlet pipe 12 to a low temperature unit 14 of a distilling and fractionating system. The liquid is received in a chamber 16, within the unit 14, which is in contact with cooled or partly cooled vapors supplied to the unit from the vaporizing boiler and hotter units of the distilling system. The chamber 16 is provided with tubes 18, or equivalent heat interchanging partitions, to provide an extensive area for the absorption of heat from the vapors in the unit into the liquid in the chamber. Accordingly, a part of the vapors in the unit 14 are condensed, giving up their latent heat of varporization to the liquid in the chamber and providing a body of condensate to be refluxed through the fractionating system or withdrawn as desired.

The heat given up by the condensing vapors heats the liquid in the chamber 16 to a temperature approaching that of the vapors and provides heat for vaporizing the lower boiling constituents of the liquid. If the liquid contains no constituents boiling at this temperature or insufficient low boiling constituents to absorb the heat given up by the condensing vapors, a stream of permanent gas or vapor may be admitted to the inlet pipe 12 through a pipe 20 and passed into the chamber with the liquid. The mixture of gas and liquid is admitted from the pipe 12 through a series of openings 22 within the chamber 16 and in passing upwardly about the pipes or tubes 18, the gas not only increases the agitation and circulation of liquids about the tubes to facilitate the transfer of heat, but also lowers the vapor pressure of the vaporized liquid and correspondingly lowers the vaporizing temperature in a manner similar to the action of a vacuum.

From the upper portion of the chamber 16, the heated liquid and vapors overflow through an outlet pipe 24 and pass to a chamber 26 in a lower and hotter unit 28 of the fractionating system. The chamber 26 is similar to the chamber 16 and the liquid is heated to a still higher temperature by the hotter vapors in the unit 28, an additional quantity of the liquid being vaporized in the chamber 26 and an additional quantity of vapors condensed in the unit 28. The liquid and vapors in the chamber 26 then overflow through a pipe 30 and pass to a chamber 32 in a higher temperature unit 34, and in succession through pipe 36, chamber 38 in unit 40, pipe 42, chamber 44 in unit 46 and pipe 48 to chamber 50 in unit 52, the liquid being heated to a higher temperature and an additional quantity of liquid being vaporized as the liquid passes through each successively higher temperature unit. It will be understood that the number of units may be varied to meet different conditions, the system of six units shown in the drawings being merely by way of example.

From the chamber 50 of the last unit, the liquid and vapor overflow through a pipe 54 to a separating chamber 56, from which the liquid may be supplied through a pipe 58 to a boiler or vaporizer 60 either alone or with the vapors produced in the preceding units as desired. Since the vapors formed in the vaporizing chambers of the fractionating units are richer in the volatile constituents and the liquid is relatively poorer in these constituents, it is usually preferable to separate the vapors from the liquid in the separating chamber 56 and pass these vapors through a pipe 62 to one of the fractionating units, for example, unit 52. In this manipulation, the liquid entering the boiler or vaporizer 60 is largely stripped of the more volatile constituents, so that vapors of these constituents are kept out of the boiler and the stripping of the volatile constituents from the residue is facilitated. A valve 64 is provided in the pipe 58 to limit the passage of fluid and thus keep the vapors from passing to the boiler through the pipe 58 and a valve 65 is provided in the pipe 62 to enable the separation and flow of the liquid and vapors to be controlled. Or, by entirely closing the valve 64, the liquid may be sent through a pipe 66 to the unit 52 and be freed of a portion of its volatile constituents before passing to the boiler. The pipe 66 is provided with a valve 67 to close it when not in use. A cone is also provided in the chamber 56 above the open end of the pipe 58, when necessary, to prevent the liquid from being projected from the pipe 54 directly into the pipe 58.

In using the apparatus for batch distillation, it is sometimes necessary or desirable to continue boiling out the residues in the boiler without the introduction of comparatively fresh liquor. In this case the liquid from the last vaporizing chamber 50 received in the separating chamber 56 may be conducted out of the system through a pipe 69 and valve 70 for storage and use in starting the next batch. In some cases, also, it may be desirable to avoid passing the vapors and liquid from the fractionating units to the boiler and, in this case, the vapors may be removed from the chamber 56 through an outlet pipe 71 and valve 72 with the liquid or the liquid may be separately removed through the pipe 69 and valve 70. In this case the latent heat of vaporization may be used in the condensation of vapors and an economy in the use of cooling water obtained.

Heat is applied in the boiler 60 to vaporize the volatile constituents still left in the liquid, a coil 73 heated from an external source, being indicated diagrammatically for this purpose. The liquid is distributed throughout the boiler through openings 74 in the pipe 58, the vapor serving the agitate the liquid and promote vaporization, when vapor is admitted to the boiler with the liquid. The exhausted residue is withdrawn through a draw-off pipe 75.

The vapors generated in the boiler 60 pass through a vapor outlet pipe 76 into the fractionating unit 52 and are brought into contact with the condensate formed in an atmosphere of vapors relatively richer in lighter constituents by means of a suitable contact apparatus. For this purpose, the vapors from the pipe 76 are received under a bubbling plate 78, which is submerged or partly submerged in condensate passing over the bottom of the unit, and bubbles under serrated edges 80 of the plate and upwardly through the condensate. Through contact with this condensate, which is richer in volatile products than the liquid in the boiler 60, the less volatile vapors from the boiler are condensed and a corresponding quantity of the most volatile of the condensed liquids are vaporized, thereby enriching the resulting vapors in volatile constituents. The vapors, thus enriched and augmented by vapors from the pipe 62 when vapors are supplied from the separator 56, come into contact with the chamber 50 and a portion of the vapors, composed principally of the less volatile constituents, is condensed. From the opposite end of the unit 52 the remaining vapors pass through a connecting pipe 82 to the unit 46 in which they are received beneath a bubbling plate 84, pass into contact with the chamber 44 in a manner similar to their passage through the unit 52, and are accordingly freed of an additional quantity of the heavier constituents and enriched in the more volatile constituents. In a similar manner, the vapors pass from the unit 46 through connecting pipe 86, through unit 40, connecting pipe 88, unit 34, connecting pipe 90, unit 28 and connecting pipe 92, to the unit 14, passing under bubbling plates 94, 96, 98, and 100 and into contact with chambers 38, 32, 26 and 16 in the respective units, and being freed of additional portions of less volatile, and enriched in lower boiling, constituents.

From the final unit 14, the vapors pass through a pipe 101 to a condenser 102 which may be of any suitable type. The vapors condensed in the condenser 102 are received in a receiver 104 in which the condensate is separated from any residual gases or vapors and drawn off through a draw-off pipe 106 while the gases or vapors may be exhausted through a vapor pipe 108. A portion of the gases may be drawn through a pipe 109 by an exhauster 110 and supplied to the pipe 20 or the pipe 109 may be closed by a valve 111 and a supply of air or gas drawn through a pipe 112 to the exhauster. The pipes 108 and 112 are provided with valves 113 and 114 to enable any desired arrangement of gas currents to be obtained.

The condensate formed in the unit 14 falls through a reflux pipe 115 to the higher temperature unit 28 in which the more volatile ends are re-evaporated and sent back to the unit 14 while the least volatile ends, after contacting with vapor escaping from under the bubbling plate 98 pass through a pipe 116 to the next lower unit 34. In a similar manner, the condensate from each unit passes successively downwardly through the reflux pipes 118, 120 and 122 until the highest temperature unit is reached. In each unit the lightest ends are removed and the least volatile ends augmented until, as the condensate reaches the exit of the last unit 52, it is of a composition approaching that of the residuum in the boiler 60 or the liquid supplied through the pipe 58. From the last unit 52, the condensate may therefore be passed through a reflux pipe 124 to the boiler 60. In some cases, as for example, in distilling certain types of petroleum, the reflux from the upper units, for example, unit 14, or higher temperature units having a distilling range within the end point of the product sought, may be sufficiently concentrated in the more volatile ends to be useful for commercial purposes or to be blended with the condensate from the condenser 102, and in this case, all of this reflux is withdrawn through a draw-off pipe 126 and none of it need be sent to the next hotter unit 28. When this is done, the quantity of distillate obtained from a given quantity of heat is greatly augmented and the thermal efficiency is accordingly increased. A saving in the consumption of cooling water is also obtained. Similarly when conditions permit condensate to be removed from higher temperature units, a still greater efficiency and increase in economy may be obtained.

With the above described arrangement, a very large quantity of reflux may be provided in the units without a correspondingly large consumption of heat and cooling water, inasmuch as the formation of condensate in the units provides a corresponding evaporative effect in the partial vaporizing chambers. The residue may therefore be maintained at a temperature at which a very high boiling vapor may be taken from the boiler and the evaporation of the residue carried to a stage where it is completely freed of any vapors which may be desired in the final distillate product while the very large quantity of reflux and the intimate contact of vapor and reflux at a large number of graded temperature stages insure a distillate product free of residues. In case a product of constant boiling point is not essential, or one comprising a mixture of products of different boiling points, as in certain petroleum products, is desired, condensate may be drawn from intermediate units, as indicated above, with a corresponding gain in evaporative effect and in thermal efficiency.

The thermal saving of the apparatus may be conveniently illustrated in the evaporation or distillation of a simple liquid medium such as water. For example, water may be supplied through the pipe 12 with air from pipe 20, saturated at 75° F., and accordingly with a partial pressure of water vapor of about 0.43 pounds per square inch. If this mixture is heated in the chamber 16 to 140° F. at which temperature the vapor pressure or partial pressure of the water is about 2.9 pounds per square inch, sufficient water will evaporate to saturate the air at this temperature. If the next stage is at 170° F., at which temperature the vapor pressure is about 6.0 pounds per square inch, an additional quantity of water will be evaporated to saturate the air and vapor mixture. Thus when the mixture finally reaches the unit 52 it may be saturated with water vapor at 190° F., for example, at which temperature the vapor pressure will be about 9.4 pounds per square inch. If a temperature gradient of say 10° F. is required between the partitions of the chambers in the last unit, the air and vapor mixture will be raised in the boiler 60 to 200° F. and saturated with vapor at a partial pressure of about 11.5 pounds per square inch. In passing reversely through the units, a corresponding quantity of vapor will condense from the vapor and gas mixture as progressively lower temperatures are reached and the partial pressure of the vapor diminishes. The quantity of liquid evaporated and condensed will accordingly be doubled, in the example given, and may be still further increased by lowering the temperature gradient in the last unit and the vaporization temperature in the boiler. In the distillation of water, as above, the condensates would, of course, not be returned to the boiler 60 but would be withdrawn from the pipe 124 through a branch pipe 128 and valve 130 the pipe 124 being closed below the pipe 128 by means of a valve 131. Or portions could be withdrawn in this example, as in the distillation of other liquids, from any unit as, for example, unit 40, by means of a draw-off pipe as pipe 132 and valve 133 branching from pipe 120. In this use of the apparatus, a multiple effect evaporation is obtained without the use of vacuum or pressure stages and consequent large and expensive installation.

In the distillation of liquids of changing boiling points, as, for example, petroleum or other mixture of volatile liquids, which contain constituents boiling at low or atmospheric temperatures and other of higher boiling points, the necessity for an inert diluting atmosphere is not so necessary and the gain from the multiple evaporative and condensing effects is more marked. In these cases the tail gases may be used where necessary and, as these contain light boiling vapors in large quantity, the resulting gas more closely resembles the liquid being distilled. It is to be understood that the apparatus is not limited or intended solely for the complete separation of a mixture of volatile liquids but may also be used for the separation of a constant boiling mixture from a mixture of liquids, as, for example, alcohol and water, the constant boiling mixture being considered as a liquid constituent.

The invention also provides an apparatus which is easily constructed and readily taken apart for cleaning or repair. The fractionating units are preferably formed of a cylindrical container into which the vaporizing chambers with their heat interchange pipes are positioned as a unit, the walls of the chambers being spaced slightly from the inner surface of the cylindrical walls of the units, forming a small annular space 136, in which the vapors circulate and contact with the outer wall of the chamber and thus provides an additional heat transfer surface. This arrangement also renders the chambers easier to install. The bubbling plates may then be placed in the units and the units closed and connected in series.

Figure 3:
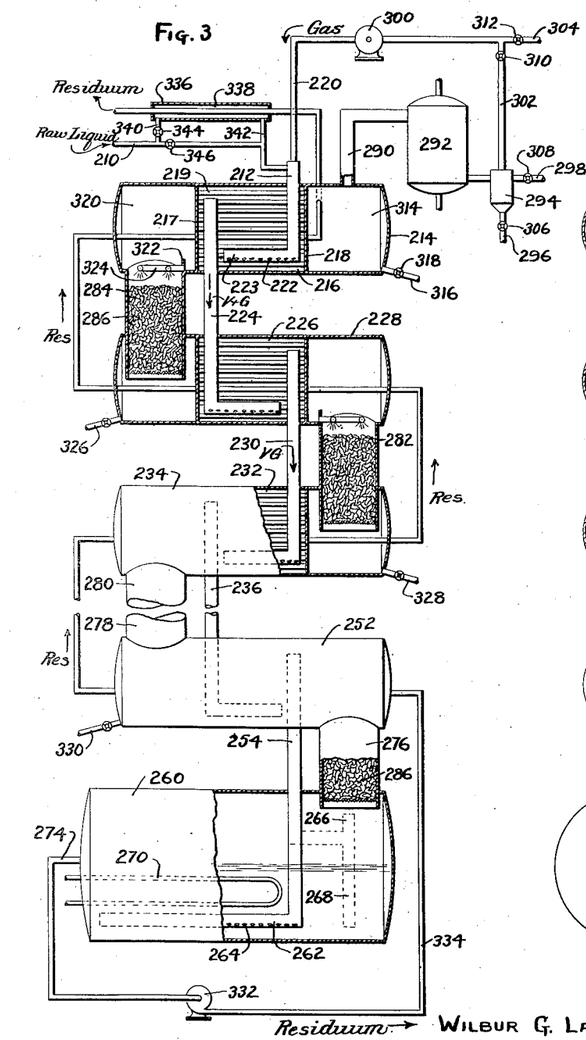
Fig. 3 is a vertical elevation, partly in section, of a modified form of embodiment of the invention, and, Fig. 4 is an end elevation, partly in section of the apparatus shown in Fig. 3.
Figure 4:
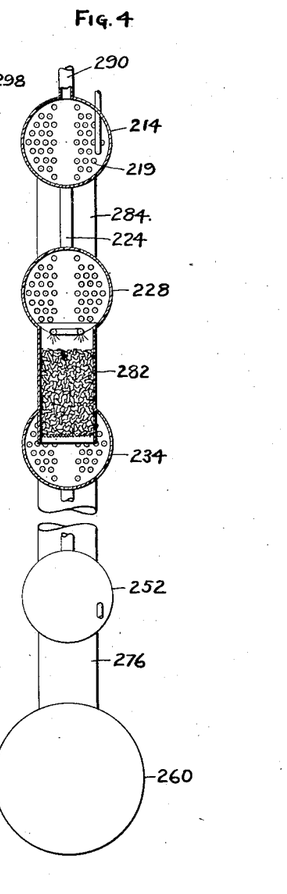

In the slightly different form of embodiment of the invention illustrated in Figs. 3 and 4, the liquid to be distilled is supplied through a feed pipe 210 to an inlet pipe 212 and to a low temperature unit 214 somewhat similar in function as the vaporizing chamber 16 of unit 14. This vaporizing chamber is, for example, formed of a pair of vertical partitions 217 and 218 extending across the unit to form the vaporizing chamber and is provided with a number of vapor tubes 219, similar to the tubes 18 of Figs. 1 and 2, extending through the chamber and headed in the partitions 217 and 218. A stream of gas is supplied through a pipe 220 to the inlet pipe 212 and passes with the liquid through a number of spaced openings 222 in a horizontal portion 223 of the pipe 212. The gas and liquid in rising upward about the vapor pipes or tubes 219 are heated and a portion of the liquid is vaporized.

From the upper part of the chamber 216, the mixture of gas, vapor and liquid overflows through an outlet pipe 224 and passes to the lower portion of a vaporizing chamber 226 in a higher temperature fractionating unit 228, similar to the chamber 216. In this chamber the liquid and vapor mixture is heated to a still higher temperature stage and an additional quantity of liquid is vaporized. From this chamber the liquid and gaseous mixture passes through an overflow pipe 230 to a vaporizing chamber 232 in the next higher temperature unit 234, having an overflow outlet pipe 236 and eventually reaches the final, highest temperature fractionating unit 252 from which it overflows through a pipe 254 to the boiler 260. The liquid and gaseous mixture may enter the boiler through a distributing pipe 262 having a series of openings 264 similar to the openings 72 illustrated in Fig. 1, or the gaseous products may be separated from the liquid products and pass through an upwardly opening pipe 266 while the liquid passes through a downwardly opening branch pipe 268. The boiler is provided with a heating pipe 270 and a draw-off pipe 274 similar to those of Fig. 1. In the boiler the liquid is stripped of those of the constituents which are desired in the distillate.

The vapors delivered to and formed in the boiler pass from the upper portion of the boiler through an outlet pipe 276 to the lower portion of the hottest unit 252 in which a portion of the vapors coming into heat interchanging relation to the liquid passing through the vaporizing chamber condenses, giving up its heat of vaporization to vaporize a corresponding quantity of liquid in the vaporizng chamber and forming a reflux of condensate for return to the boiler. After passing through the heat interchanging tubes of the vaporizing chamber, the partly cooled vapor and gaseous mixture passes out of the unit to the next cooler unit. In this manner the vapors pass in succession from unit to unit through connecting vapor pipes 278, 280, 282 and 284 to the first or coolest unit 214. In passing through each of the pipes 276, 278, 282 and 284, the gases and vapors are brought into intimate contact with condensate from the next higher unit by means of a suitable gas and liquid contact apparatus. As indicated in the embodiment illustrated in Figs. 3 and 4, this contact means may be formed of a checker work, or coke columns 286 supported on a supporting screen, in its respective pipe 276—284. An even contact is obtained which enables an equilibrium to be attained between the upwardly passing vapors and the downwardly trickling liquid reflux which abstracts the lower boiling constituents from the reflux and enriches the vapors in these constituents.

From the lowest temperature unit the vapors and gases pass through a pipe 290 to a condenser 292, in which the remaining condensable vapors are condensed. From the condenser the condensates and residual vapors and gases are received in a collector or separator 294 from which the condensate may be withdrawn through a draw-off pipe 296. The residual gases may be passed to the atmosphere through a pipe 298, or may be drawn by an exhauster blower 300 through a pipe 302 and supplied to the pipe 220. Or a supply of air or gas from an exterior source may be supplied to the blower 300 through a pipe 304. The flow of fluids through the pipes 296, 298, 302 and 304 is controlled by means of suitable valves 306, 308, 310 and 312, respectively.

The condensates, or a portion of them, formed in the various units are returned to the boiler 260, the condensates from each unit being freed from the lightest boiling constituents and themselves condensing and retaining a corresponding quantity of heavier constituents as they pass toward the boiler. A portion of the condensates which are formed in the pipe 290 and other parts of the coolest unit 214 and which is substantially the same as the product desired is collected in a compartment 314 formed in the unit 214 between the partition 218 and the adjacent end and is withdrawn through a draw-off pipe 316 controlled by a suitable valve 318. The condensates formed in the tubes 219 of the unit, however, flow into a compartment 320 formed between the opposite partition 217 and the opposite end of the unit which receives the vapors from the pipe 284. This condensate is trapped by a dam 322 and is conveyed through distributing pipes 324 extending above the coke or checker work 286, and is distributed over the checker work. As the condensates trickle downwardly through the checker work they are brought into intimate contact with the hot vapors and gases passing upwardly through the pipe 284 and the lowest boiling constituents are re-evaporated and passed with the upwardly moving vapors to the lowest temperature unit. The condensates then pass through the lowermost tubes of the unit 228 and through successive lower pipes 282, 280, 278 and 276 to the boiler 260, reaching the boiler with a composition approaching that of the residuum in the boiler. The units 228, 234 and 252 are provided with suitable draw-off pipes 326, 328 and 330, respectively, for withdrawing condensates whenever such condensates have a composition suitable for commercial purposes.

The residuum withdrawn through the pipe 274 contains some heat which may be supplied to the condensates or the liquid supplied to the system. For this purpose, the residuum may be forced by means of a pump 332 through a pipe 334 extending successively through the units 252 to 214 and in heat interchanging relation to the fluids contained therein. The residuum may also be passed through a heat interchanger 336 having a compartment 338 through which the inflowing liquid may be passed from the pipe 210 by means of connecting pipes 340 and 342 and controlling valves 344 and 346.

It is to be understood that the method and apparatus may be operated under reduced pressure or partial vacuum for the purpose of reducing or eliminating any tendency for the products being distilled or evaporated to be cracked or scorched or may be operated under increased or superatmospheric pressures to enable cracking or other reactions to be obtained or to vary or modify the boiling temperatures and proportions of constant boiling point mixtures or otherwise controlling the conditions and characteristics of the boiling or distilling liquids.

Having described the invention, what I claim and desire to secure by Letters Patent is:

1. Apparatus of the type described which comprises, fractionating units connected in series for the passage of vapors, means for passing liquid through said units isolated from, and counter current to the flow of vapors therethrough, means for agitating liquid held in one unit by the vapors from a preceding unit, means for vaporizing portions of said liquid in said units with heat from said vapors, and means for scrubbing vapors with condensates in said units.

2. Apparatus of the type described which comprises, fractionating units connected in series for the passage of vapors, means for passing liquid through said units isolated from, and counter current to the flow of vapors therethrough, means for vaporizing portions of said liquid in said units with heat from said vapors, means for agitating liquid in one unit by vapors from a preceding unit, means for scrubbing vapors with condensates in said units, and means for refluxing condensates through said series of units.

3. Apparatus of the type described which comprises, a series of fractionating units, a vaporizing unit in each of said fractionating units, a boiler, means for passing fluid through said vaporizing units in succession to said boiler, means for passing vapors from said boiler through said fractionating units counter current to said fluid and in heat interchanging relation separate from the fluid in said vaporizing units, and means for separating the vapors formed from said fluid passing to said boiler at a point adjacent the boiler and adding said vapors to the vapors from said boiler.

4. Apparatus of the type described which comprises, a series of fractionating units through which vapors may pass in succession, a bubbling plate in each unit for contacting condensates in said unit with vapors from an adjacent unit, vaporizing chambers in said units, vapor tubes extending through said chambers, a liquid inlet to each chamber below said tubes, and a liquid and vapor outlet from each chamber leading to the liquid inlet of an adjacent chamber.

5. Apparatus of the type described which comprises, a series of fractionating units through which vapors may pass in succession, a bubbling plate in each unit for contacting condensates in said unit with vapors from an adjacent unit, reflux pipes leading from one unit to an adjacent unit, vaporizing chambers in said units, vapor tubes extending through said chambers, a liquid inlet to each chamber below said tubes, and a liquid and vapor outlet from each chamber leading to the liquid inlet of an adjacent chamber.

6. Apparatus of the type described which comprises, a series of fractionating units through which vapors may pass in succession, vaporizing chambers in said units, vapor tubes extending through said chambers, a liquid and gas inlet and distributing pipe to each chamber below said tubes, a liquid and vapor outlet from each chamber leading from above said tubes to the liquid and gas inlet of an adjacent chamber, a condenser connected to receive vapors from one of said units, means for separating gases from the condensate formed in said condenser, and means for passing said separated gases to the liquid and gas inlets of the vaporizing chambers in said units.

7. A unit for apparatus of the type described which comprises, a vapor container, a closed evaporating chamber in said vapor container arranged to have a heat interchanging contact with vapors and liquid passing through said container, a bubbling plate in the lower part of said container, and an inlet to said container opening under said bubbling plate.

8. A unit for apparatus of the type described which comprises, a cylindrical vapor container, an evaporating chamber in said vapor container but separate therefrom, a condensate outlet from said vapor container, a vapor inlet in a lower cylindrical wall of said vapor container and a bubbling plate over said inlet between said outlet and said evaporating chamber and having a serrated edge resting on the lower cylindrical wall of said vapor container over which condensate may pass from said evaporating chamber to said outlet.

9. A method of distilling liquids which comprises, passing liquid through stages of increasing temperature and vaporizing successive quantities of liquid in said stages, advancing the vapors formed in each stage to the next succeeding higher temperature stage and contacting the same with the liquid therein, passing vapors from the final stage through successively lower temperature stages in heat interchanging relation to, and out of contact with, said liquid being vaporized to condense successive portions of said vapors, contacting the vapors with the condensates formed in said stages and refluxing the condensates through said stages.

10. Apparatus of the type described which comprises, a number of fractionating units having condensing chambers and vaporizing chambers in heat interchanging relation to each other, a boiler, means for passing vapors from said boiler in succession through the condensing chambers of said units, means for passing liquid through the vaporizing chambers of said units counter current to the passage of said vapors therethrough, and means for passing the liquid from the last of said vaporizing chambers through the highest temperature condensing chamber in contact with vapors and then with condensate to said boiler.

11. An apparatus for distilling liquids comprising a boiler, a series of fractionating units connected to said boiler and each having a condensing chamber and a vaporizing chamber therein, means for passing oil to be distilled through said vaporizing chambers in series and from the last of said chambers to said boiler, means for passing vapors from said boiler through said condensing chambers in series, the vapors passing through the units in reverse order to that in which the oil passes through the units on its way to the boiler, said units having diaphragms therein completely separating the vapors passing away from said boiler from the material in said vaporizing chambers, means whereby a body of oil is maintained in each of said vaporizing chambers in position to receive heat of condensation from vapors condensing in said condensing chambers, means whereby vapors formed in a given one of said vaporizing chambers are carried into contact with the oil in a body of oil in a vaporizing chamber between the one in which the vapors are originally formed and the boiler, means for passing gases into the first of said units and through said vaporizing chambers, boiler and condensing chambers along with the oil and vapors therein, and means for passing condensate through said condensing chambers in series countercurrent to the gas and vapors flowing away from the boiler.

12. An apparatus for distilling oil comprising a boiler, a series of units connected in series and to said boiler, each of said units having a condensing chamber and a vaporizing chamber therein, the connections between said units and said boiler being such that oil to be distilled passes through said vaporizing chambers in series into said boiler and vapors from said boiler pass through the condensing chambers of said units in the reverse order to that in which the oil passes through the units, means whereby material in said condensing chambers is maintained entirely separate from the material in said vaporizing chambers, and means whereby a body of oil is maintained in each of said vaporizing chambers and in position to receive heat of condensation from vapors condensing in the condensing chambers of the same unit, the connections between the vaporizing chambers of said units being such that vapors formed in one vaporizing chamber pass along with the oil flowing to the boiler into the body of oil contained in the next vaporizing chamber toward the boiler and beneath the surface of said latter body, means for passing gases into the first of said units and through said units and boiler along with the oil and vapors treated therein, and means for passing condensate through said condensing chambers in series countercurrent to the gas and vapors flowing away from the boiler.

13. An apparatus for distilling oil comprising a boiler, a series of units connected in series and to said boiler, each of said units having a condensing chamber and a vaporizing chamber therein, the connections between said units and said boiler being such that oil to be distilled passes through said vaporizing chambers in series into said boiler and vapors from said boiler pass through the condensing chamber of said units in the reverse order to that in which the oil passes through the units, means whereby material in said condensing chambers is maintained entirely separate from the material in said vaporizing chambers, means whereby a body of oil is maintained in each of said vaporizing chambers and in position to receive heat of condensation from vapors condensing in the condensing chambers of the same unit, the connections between the vaporizing chambers of said units being such that vapors formed in one vaporizing chamber pass along with the oil flowing to the boiler into the body of oil contained in the next vaporizing chamber beneath the surface of said latter body, means for refluxing condensates through the condensing chambers of said units, and means for passing gases into the first of said units and through said units and boiler along with the oil and vapors treated therein.

14. The process of distilling liquids which comprises heating the liquid to be distilled to a distilling temperature, passing the vapors evolved from said liquid through a fractionating system in which condensate collects in a series of pools, passing said vapors through said pools in contact with said condensate, passing fresh liquid in a direction counter to the flow of said vapors and in heat exchange but out of contact with said pools of condensate whereby said fresh liquid is preheated and said pools of condensate are cooled, adding said preheated liquid to the liquid being distilled and passing a gas with said fresh liquid in heat exchange with said pools of condensate whereby the heat transfer between said condensate and said liquid is increased.

15. The process of treating liquids which comprises subjecting the liquid to be treated to distillation, passing the vapors evolved from said liquid through a series of condensing zones of decreasing temperature, collecting the condensate formed from such vapors in pools in said zones, passing the vapors through said pools in direct contact with the condensate therein, passing fresh liquid to be distilled and gas through said zones countercurrent to the flow of said vapors but out of direct contact therewith, refluxing the condensates through said zones counter to the flow of said vapors and passing fresh liquid and reflux condensate from the highest temperature zone into said liquid being distilled.

16. The process of distilling petroleum oils, which comprises heating the oil to be distilled to a distilling temperature, passing the vapors evolved from said oil through a fractionating system in which condensate collects in a series of pools, passing said vapors through said pools in contact with said condensate, passing fresh oil in a direction counter to the flow of said vapors and in heat exchange but out of contact with said vapors, whereby said fresh oil is preheated and said vapors are cooled, adding said preheated liquid to the liquid being distilled, and passing a gas with said fresh liquid in heat exchange with said vapors whereby the heat transfer between said vapors and said liquid is increased.

17. The process of distilling and fractionating petroleum oils, which comprises heating and vaporizing oil in a distilling zone, passing vapors evolved from said oil through a series of condensing zones of decreasing temperature, collecting condensate formed from such vapors in pools in said zones, passing the vapors through said pools in direct contact with the condensate therein, passing fresh oil through said zones countercurrent to and in indirect heating exchange with said vapors to heat said oil and vaporize portions thereof in each zone, passing the resulting vapors forward in contact with unvaporized oil, and introducing the unvaporized oil from the last heat exchange with said vapors into said distilling zone.

18. The process of distilling oils, which comprises progressively raising the temperature of a mixture of oil and oil vapor while advancing the mixture through a series of heating zones in the last of which the oil is heated to the desired distilling temperature, intimately contacting the vapors and oil in their passage through said zones, removing the vapors maintained in intimate contact with the unvaporized oil in said last zone, and passing them through and in contact with a series of bodies of condensate produced from said vapors and maintained at gradually decreasing temperatures to rectify and fractionate said vapors.

19. An apparatus for the distillation and fractionation of oils, comprising a distilling chamber and a vapor fractionating system connected thereto, means for conducting vapors from said chamber through said system, means for maintaining a series of bodies of condensate in said fractionating system through which said vapors pass, a series of banks of heating tubes in said vapor fractionating system, means for passing oil through said system in contact with said banks of heating tubes to preheat the oil and vaporize portions thereof, means for passing vapors from the last bank of heating tubes directly into the vapor stream from said chamber, and means for passing the remaining preheated oil into said chamber.

20. The process of distilling petroleum, which comprises passing the oil to be distilled successively through a series of vapor condensing zones in heat exchange but out of contact with vapors passing therethrough, thereby to heat said oil and vaporize portions thereof, advancing the oil and resulting vapors together through said zones, separating said resulting vapors from unvaporized oil and introducing the separated vapors into one of said zones, passing the unvaporized oil into a stripping zone in contact with hot oil vapors from a heating zone, and passing unvaporized oil from said stripping zone to said heating zone to supply oil for the production of said hot oil vapors.

21. The process of distilling and fractionating petroleum oil, which comprises heating the petroleum oil to a temperature adapted to vaporize portions thereof, passing the vapors formed from said heating through a vapor fractionating apparatus in which the vapors are bubbled through pools of condensate maintained therein, subjecting the unvaporized oil from said heating to intimate contact with hot oil vapors from an oil heating and vaporizing zone, thereby to vaporize further portions of said oil, and passing the unvaporized oil remaining after said contact to said heating zone for the production of said hot oil vapors.

22. The process of distilling and fractionating petroleum oils, which comprises heating oil to be treated to a temperature sufficient to vaporize portions thereof, passing the vapors formed from said heating through a series of reflux zones of decreasing temperature counter-current to and in contact with condensate passing therethrough, further heating the unvaporized oil to a higher temperature to vaporize additional quantities of said oil, passing the vapors resulting from the latter heating through and in contact with condensate from the highest temperature reflux zone and then with said first mentioned vapors through said zones.

23. The process of distilling petroleum oils, which comprises continuously passing oil vapors and fresh oil to be treated in indirect heat exchange in a reflux condensing zone to heat and vaporize portions of the oil as it flows through said zone and to condense portions of the vapors, introducing the vapors formed from the oil during said heat exchange into said zone, further heating the unvaporized portion of the oil to a higher temperature to effect the vaporization of further quantities thereof, withdrawing reflux condensate from said zone, contacting the vapors formed from heating unvaporized oil from said zone with said withdrawn reflux condensate and with unvaporized oil flowing from said zone prior to heating the latter, and then passing the vapors from said contacting into said zone.

24. A system for the distillation and fractionation of petroleum oils, comprising a vapor fractionating apparatus and an oil vaporizer, means for passing fresh charging oil through said apparatus in indirect heat exchange with the vapors therein to heat and vaporize portions of said oil and to condense portions of said vapors, means for passing preheated oil from said apparatus to said vaporizer, means for contacting the vapors from said vaporizer with condensate produced in said apparatus and with oil being conducted from said fractionating apparatus to said vaporizer immediately prior to passing the same into said vaporizer.

25. A continuous process of fractionally distilling petroleum oil containing relatively low boiling point constituents, which comprises passing the said oil to be distilled through a series of heat exchange zones of increasing temperature in heat exchange with vapors of the process, vaporizing portions of the said oil in said zones and maintaining the vaporized and unvaporized constituents thereof in contact during their passage through said zones, further heating the unvaporized constituents of the said oil to effect vaporization of additional portions thereof, combining the vapors formed from the oil in said zones with those formed in the last mentioned heating, passing the resulting vapor mixture through said series of zones in indirect heat exchange with said oil, said vapor mixture being passed alternately in heat exchange with said oil in one of said zones and in contact with one of a series of bodies of condensate formed from said vapors, and withdrawing condensate from a plurality of said bodies.

In testimony whereof I affix my signature.

WILBUR G. LAIRD.